United States Patent
Elias et al.

(10) Patent No.: US 11,347,498 B2
(45) Date of Patent: May 31, 2022

(54) BYTECODE MODIFICATION

(71) Applicant: Red Hat, Inc., Raleigh, NC (US)

(72) Inventors: Filip Elias, Vysni Lhoty (CZ); Filip Nguyen, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 254 days.

(21) Appl. No.: 13/777,504

(22) Filed: Feb. 26, 2013

(65) Prior Publication Data

US 2014/0245275 A1  Aug. 28, 2014

(51) Int. Cl.
*G06F 8/656* (2018.01)
*G06F 9/455* (2018.01)

(52) U.S. Cl.
CPC .......... *G06F 8/656* (2018.02); *G06F 9/45504* (2013.01)

(58) Field of Classification Search
CPC .............................. G06F 8/656; G06F 9/45504
See application file for complete search history.

(56) References Cited

U.S. PATENT DOCUMENTS

| | | | | |
|---|---|---|---|---|
| 6,072,953 A * | 6/2000 | Cohen | ................ | G06F 9/44521 |
| | | | | 717/118 |
| 6,314,558 B1 * | 11/2001 | Angel | ................ | G06F 11/3612 |
| | | | | 714/35 |
| 6,851,112 B1 * | 2/2005 | Chapman | ............ | G06F 9/45504 |
| | | | | 718/1 |
| 6,857,119 B1 * | 2/2005 | Desai | ........................ | G06F 8/67 |
| | | | | 717/140 |
| 7,035,870 B2 * | 4/2006 | McGuire | ................... | G06F 9/52 |
| | | | | 707/704 |
| 7,406,687 B1 * | 7/2008 | Daynes et al. | ................ | 717/166 |
| 7,743,367 B1 * | 6/2010 | Nikolov et al. | .............. | 717/148 |
| 7,784,044 B2 | 8/2010 | Buban et al. | | |
| 7,895,580 B1 * | 2/2011 | Nikolov | ......................... | 717/130 |
| 8,117,587 B1 * | 2/2012 | Testardi | .................. | G06F 8/447 |
| | | | | 717/100 |
| 8,239,861 B2 * | 8/2012 | Swart | ................... | G06F 9/44594 |
| | | | | 718/1 |
| 8,302,108 B1 * | 10/2012 | Hurren | ...................... | G06F 8/61 |
| | | | | 709/226 |
| 8,719,566 B2 * | 5/2014 | Leichsenring | .......... | G06F 21/53 |
| | | | | 713/157 |
| 9,075,635 B1 * | 7/2015 | Baird | ....................... | G06F 9/455 |
| 2002/0049963 A1 * | 4/2002 | Beck | ....................... | G06F 9/449 |
| | | | | 717/130 |
| 2002/0073409 A1 * | 6/2002 | Lundback | ........... | G06F 11/1482 |
| | | | | 717/170 |
| 2002/0095661 A1 * | 7/2002 | Angel | ................. | G06F 11/3636 |
| | | | | 717/130 |

(Continued)

OTHER PUBLICATIONS

Arnold et al., "Ksplice: Automatic Rebootless Kernel Updates," Massachusetts Institute of Technology, Proceedings of the 4th ACM European conference on Computer systems, 2009, 12 pages.

*Primary Examiner* — Jacob D Dascomb
(74) *Attorney, Agent, or Firm* — Lowenstein Sandler LLP

(57) ABSTRACT

Systems and methods for modifying bytecode at runtime are provided. A virtual machine can execute bytecode of an application. The virtual machine can receive a modification for the application that includes modified bytecode for the application. The virtual machine can identify a portion of the bytecode of the application that corresponds to the modified bytecode. The virtual machine can update the portion of the bytecode of the application at runtime using the modification.

13 Claims, 5 Drawing Sheets

(56) References Cited

U.S. PATENT DOCUMENTS

| | | | |
|---|---|---|---|
| 2003/0106043 A1* | 6/2003 | Bernadat | G06F 9/445 717/116 |
| 2004/0010786 A1* | 1/2004 | Cool | G06F 8/65 717/170 |
| 2004/0031020 A1* | 2/2004 | Berry | G06F 11/3409 717/130 |
| 2005/0039187 A1* | 2/2005 | Avakian | G06F 11/3476 719/310 |
| 2006/0036426 A1* | 2/2006 | Barr et al. | 703/22 |
| 2006/0112037 A1* | 5/2006 | Chagoly | G06F 11/3624 706/20 |
| 2006/0225059 A1* | 10/2006 | Plaxton | G06F 9/445 717/148 |
| 2007/0006185 A1* | 1/2007 | Choi et al. | 717/137 |
| 2009/0064114 A1* | 3/2009 | Bottomley | G06F 9/45504 717/148 |
| 2009/0089749 A1* | 4/2009 | Day | G06F 9/445 717/118 |
| 2009/0089766 A1* | 4/2009 | Day | G06F 9/45516 717/148 |
| 2010/0005527 A1* | 1/2010 | Jeon | G06F 16/958 726/22 |
| 2010/0199259 A1* | 8/2010 | Quinn | G06F 9/44536 717/106 |
| 2011/0035735 A1* | 2/2011 | Kramp et al. | 717/148 |
| 2011/0283256 A1* | 11/2011 | Raundahl Gregersen | G06F 8/656 717/108 |
| 2011/0320681 A1* | 12/2011 | Borntraeger | G06F 12/109 711/6 |
| 2012/0304160 A1* | 11/2012 | Soeder | G06F 9/4426 717/148 |
| 2012/0304172 A1* | 11/2012 | Greifeneder | G06F 11/3419 718/1 |
| 2013/0007733 A1* | 1/2013 | Fries | G06F 8/68 718/1 |
| 2013/0014256 A1* | 1/2013 | Krizenecky | G06F 21/54 726/23 |
| 2013/0047155 A1* | 2/2013 | Caspole | G06F 9/445 718/1 |
| 2013/0104125 A1* | 4/2013 | Sarma | G06F 21/10 718/1 |

* cited by examiner

BYTECODE MODIFICATION

TECHNICAL FIELD

Embodiments of the present disclosure relate to modifying bytecode, and more specifically, to modifying bytecode in a virtual machine at runtime.

BACKGROUND

Managed computer systems allow an application to be executed on any platform regardless of the underlying hardware or operating system. This can be accomplished by writing the application using managed code, commonly referred to as "bytecode," that is executed using a virtual machine. A virtual machine can use an interpreter or a just-in-time (JIT) compiler to execute the bytecode. To run the application, the interpreter or JIT compiler can translate the bytecode into a form that is useable by the underlying hardware or operating system. There can be a virtual machine that is specific to each operating system, thereby enabling the application to run on any operating system.

Like many computer applications, applications executed within a managed computer system can contain imperfections or aspects that could benefit through improvement. Such applications can be modified or updated through modifications, such as patches, updates, service packs, etc. Updating an application on a managed computer system can be time consuming and can entail restarting the virtual machine, which can result in downtime and unavailability for other applications running on the virtual machine or even for the computer system as a whole.

BRIEF DESCRIPTION OF THE DRAWINGS

The present disclosure is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Methods, apparatuses and systems for modifying bytecode at runtime are described herein. Bytecode is platform-independent computer code that can be produced by a compiler of a high-level programming language, such as Java®. Conventionally, modifying bytecode in a managed computing system entails restarting a virtual machine that can execute the bytecode, which can render applications run by the virtual machine inoperable until a restart is complete. Implementations of the present disclosure allow modification of bytecode of an application loaded on the virtual machine without restarting the virtual machine after modification. The virtual machine can receive a modification for the application. The virtual machine can identify a portion of bytecode that corresponds to the modification. At runtime of the virtual machine (e.g., when the virtual machine is executing bytecode), the virtual machine can update the identified bytecode portion using the modification. Regardless of the size of the modification, modifying the bytecode at runtime can reduce productivity losses due to downtime and save time without restarting the virtual machine. As a result, an application in a virtual machine can be updated without restarting the virtual machine.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Figure 1:
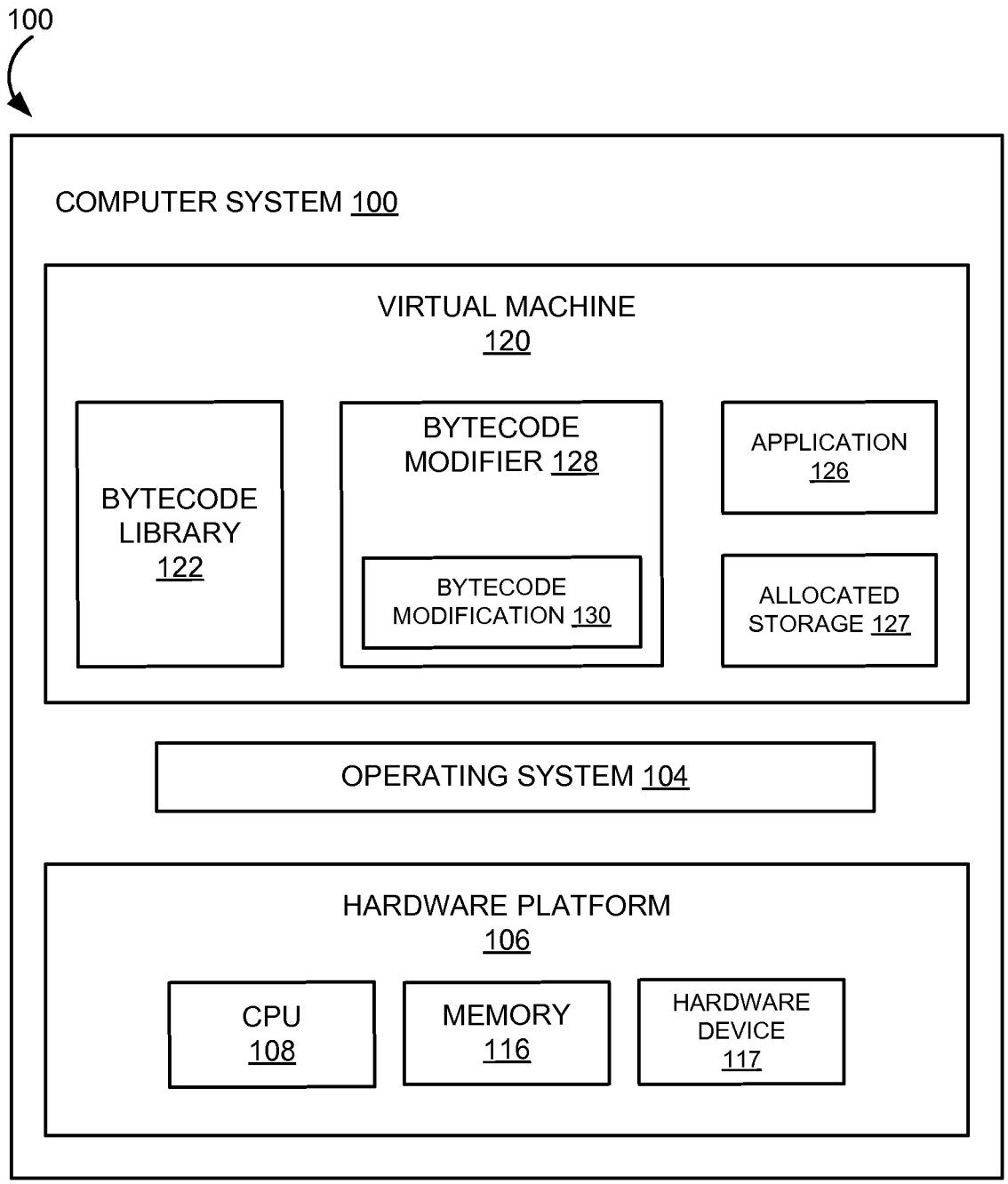
FIG. 1 is a block diagram that illustrates an example system architecture in which embodiments of the present disclosure may be implemented.

FIG. 1 illustrates a component diagram of an example computer system 100 in which embodiments may operate. The computer system 100 may be a server, a server cluster, a workstation, a personal computer (PC), a mobile device, a tablet computer, a laptop computer, or any other device, machine, or cluster of machines capable of hosting a virtual machine. The computer system 100 can be communicably connected to a network (not shown), such as a private network (e.g., a local area network (LAN), wide area network (WAN), intranet, etc.) or a public network (e.g., the Internet). Computer system 100 can include a hardware platform 106, an operating system 104 that executes on the hardware platform 106 and a virtual machine 120. Operating system (OS) 104 may be a Microsoft® Windows® OS, Linux® OS, Solaris® OS, Android® PS, Apple® iOS®, etc.

Hardware platform 106 may include one or more central processing units (CPU) 108, memory 116, and at least one hardware device 117. Examples of hardware devices 117 include network interface cards (NICs), sound or video adaptors, photo/video cameras, printer devices, keyboards, displays or any other suitable device intended to be coupled to a computer system.

Virtual machine 120 can be implemented to run on any operating system 104, and can also be implemented to run directly on any hardware platform 106. The virtual machine 120 is a portion of software that can execute platform-independent bytecode in any programming language. Virtual machine 120 can translate bytecode into a form useable by underlying operating system 104. Bytecode can be code in a standardized portable binary format that may be used, for example, to create an application 126. Bytecode can have the form of one or more class files (e.g., Java class files) and is executed by the virtual machine 120. In some implementations, multiple class files can be grouped together in a package, such as an archive file. Examples of archive files include Java archive (.jar) files, web archive (.war) files, etc.

The virtual machine 120 can be a Java Virtual Machine (JVM) that can execute bytecode in various programming language, such as Java, Armed Bear Common Lisp, Clojure, Erjang, Fantom, Free Pascal, Gosu, Groovy, Jacl, JavaFX Script, JRuby, Jython, Kotlin, NetRexx, Processing, Quercus, Rhino, Scala, etc. In one implementation, JVM can execute application 126 comprised of Java bytecode such as a Java class file, where the Java class file contains Java bytecode that can be executed on the JVM. Application 126 may include one or multiple Java class files.

The virtual machine 120 can include a bytecode library 122, an application 126, an allocated storage 127 and a bytecode modifier 128. Bytecode library 122 is a collection of bytecode (e.g., class files, etc.). Bytecode library 122 may be a dynamic loadable library that application 126 can call at runtime. The bytecode library 122 can provide the virtual machine 120 a well-known set of functions to perform common tasks. When the virtual machine 120 is instantiated, the bytecode library 122 can be loaded with a default set of standard bytecode (e.g., a default set of class files). In one implementation, the virtual machine is a JVM, the bytecode library 122 is a Java class library.

When called upon by application 126, standard bytecode can be loaded into the allocated storage 127 from the bytecode library 122 of the virtual machine 120. The allocated storage 127 may be a container or storage area that has been allocated to virtual machine 120. The allocated storage 127 may be a directory, an area of allocated memory, or any other medium allocated to the virtual machine 120 that is suitable for storing bytecode. In one embodiment, virtual machine 120 includes a cache (e.g., a simulated cache, a virtual cache, etc.) that stores class files. The cache can be allocated memory that allows faster access to class files stored in the cache than for class files stored elsewhere.

When virtual machine 120 executes application 126, it can call upon bytecode (e.g., Java class files). Such bytecode may include bytecode from the bytecode library 122, bytecode from class files of the application 126 and/or bytecode from external sources. A bytecode loader, such as a Java class loader, can load standard bytecode from the object library 122 into the allocated storage 127 for use by the application 126. For bytecode not included in the bytecode library 122, the bytecode loader can identify and obtain such bytecode from one or more external sources and load it into the allocated storage 127. Typically, bytecode can remain in the allocated storage 127 until there are no applications 126 that call upon the bytecode. A garbage collector can remove any unused bytecode.

Bytecode modifier 128 can update the bytecode at runtime of the virtual machine 120 and of an application 126 associated with (e.g., using) the bytecode. From time to time, the bytecode modifier 128 may identify a bytecode modification 130. The bytecode modification may be, for example, a patch, an update, a service pack, etc. that will affect existing bytecode. The bytecode modification 130 can a represent a minor change or a major change with respect to the existing bytecode. The bytecode modification 130 may include one or more modified class files that replace existing class files in the virtual machine 120 and can include a modified version of the existing class file. The bytecode modification 130 may additionally be used to modify or update portions of existing bytecode. For example, the bytecode modification 130 may modify class files that contain bytecode. Such replacement of class files and modification of existing bytecode may be performed for bytecode used by application 126 at runtime. One implementation of bytecode modifier 128 is described in greater detail in conjunction with FIG. 2.

Figure 2:
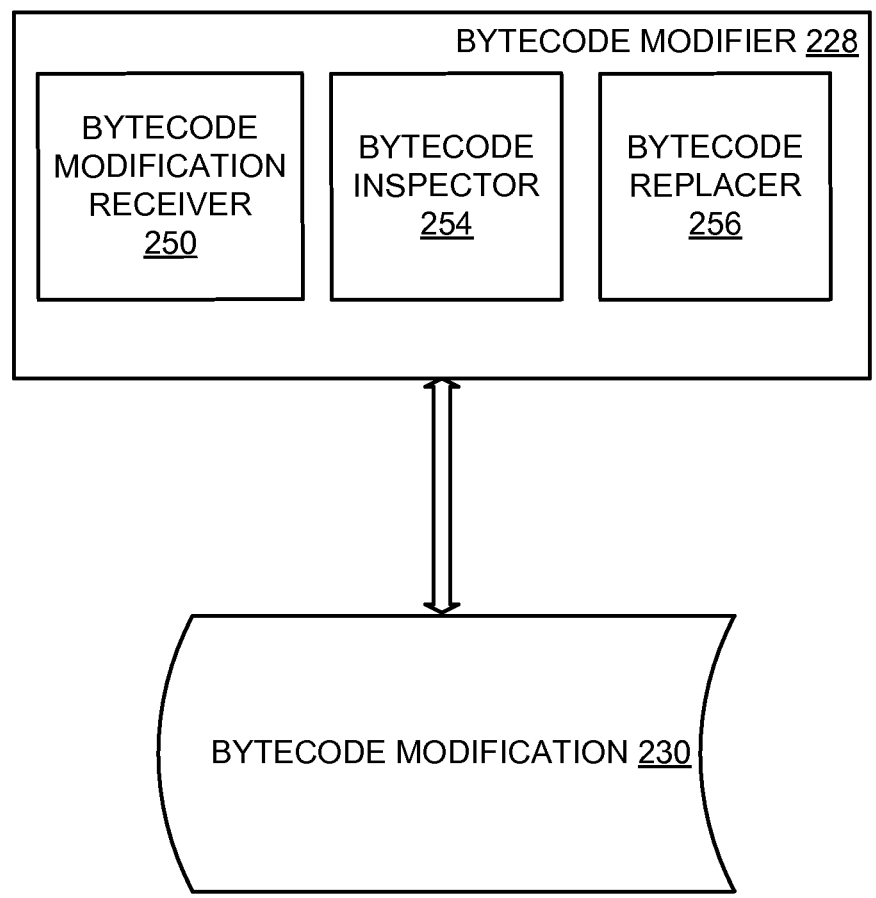
FIG. 2 is a block diagram illustrating one embodiment of a bytecode modifier.

FIG. 2 illustrates a bytecode modifier 228 in accordance with one implementation. The bytecode modifier 228 may be the same or similar as the bytecode modifier 128 in virtual machine 120 of FIG. 1. The bytecode modifier 228 can be used to modify bytecode of an application in a virtual machine at runtime of the application 126 and/or of the virtual machine 120. The bytecode modifier 228 may include a bytecode modification receiver 250, a bytecode inspector 254, and a bytecode replacer 256. Alternatively, the functionality of one or more of the bytecode modification receiver 250, bytecode inspector 254, or bytecode replacer 256 may be combined into a single module, or may be divided into additional modules.

The bytecode modification receiver 250 can receive a bytecode modification 230 from a remote source, such as a server that sends bytecode modifications to known virtual machines. The bytecode modification 230 can be used to modify, update or fix existing bytecode (e.g., an existing class file) in the virtual machine 120 using modified bytecode (e.g., a modified Java class file). The bytecode modification 230 can be the same or similar as the bytecode modification 130 of FIG. 1. The bytecode modification 230 can have an identifier to help the bytecode modifier 228 identify which existing bytecode to modify (e.g., a class file that has a name that corresponds with a class file in the existing bytecode). After the bytecode modification 230 is received, it can be stored in any location accessible to components of bytecode modifier 228. The bytecode modification receiver 250 can passively receive the bytecode modification 230 or it can actively retrieve bytecode modification 230. In one implementation, bytecode modification receiver 250 includes an application, or a thread within an application, that monitors a directory or storage location for bytecode modification 230. The directory or storage location can be within the virtual machine 120 of FIG. 1, associated with the hardware platform 106 of FIG. 1, on a remote server, or on any other location accessible by the virtual machine 120 of FIG. 1. When the bytecode modification receiver 250 identifies the bytecode modification 230, it can notify the bytecode inspector 254 that it received the bytecode modification 230. In one implementation, Java Management Extensions (JMX) standard MBeans can be used to initiate the process to update bytecode in the virtual machine 120. Standard MBeans can used to transmit notifications when certain predefined events occur. For example, standard MBeans can be used to notify bytecode insector 254 that bydecode modification receiver 250 received the bytecode.

To begin a bytecode modification sequence, the bytecode inspector 254 may analyze the bytecode modification 230 to identify the contents of the bytecode modification 230. The contents of the bytecode modification 230 can be used, for example, to identify existing bytecode in the virtual machine that corresponds to the bytecode in the bytecode modification 230. In one implementation, the bytecode inspector 254 can identify the contents of the bytecode modification 230 by parsing code, bytecode, files and/or filenames in the bytecode modification 230. In another implementation, the bytecode inspector 254 can identify an index file of the bytecode modification 230 that describes the contents of the bytecode modification 230.

Once the bytecode inspector 254 identifies the contents of the bytecode modification 230, it can use the contents of the bytecode modification 230 to identify corresponding bytecode in the virtual machine 120. The bytecode inspector 254 can scan allocated storage 127 of FIG. 1 to identify a portion of existing bytecode (e.g., a class file), that corresponds to modified bytecode (e.g., a modified class file) in the bytecode modification 230. In one implementation, the bytecode inspector is a heap inspector that inspects allocated storage (e.g., heap) of a JVM. The bytecode modification 230 can include information that helps bytecode inspector 254 identify which existing bytecode to modify. The bytecode inspector 254 can use any characteristic of the bytecode modification to identify corresponding bytecode that exists in the virtual machine, such as file names, class names, meta data, etc. For example, the bytecode modification 230 can include files with the same or similar name as files existing in the bytecode of the application. After identifying the modified bytecode, the bytecode inspector 254 can identify existing bytecode that corresponds to the bytecode modification 230. The bytecode inspector 254 can inform the bytecode replacer 256 which existing bytecode to modify.

The bytecode replacer 256 modifies existing bytecode in the virtual machine 120 identified by the bytecode inspector 254. The bytecode replacer 256 can add to, supplement, or subtract from bytecode existing in the virtual machine 120. In one implementation, the bytecode replacer 256 can replace the existing bytecode with the bytecode modification 230 at runtime. For example, the bytecode replacer 256 can replace existing bytecode (e.g., Java class files) with replacement bytecode (e.g., modified Java class files) from the bytecode modification 230.

When the bytecode replacer 256 attempts to replace bytecode in the virtual machine that is executing (e.g., when trying to update bytecode of an application that is in use), the bytecode replacer 256 can wait until the application is no longer in use and then replace the bytecode. In another implementation, the bytecode replacer 256 can modify the bytecode while the application is in use. In this implementation, the bytecode replacer 256 can copy the bytecode modification 230 to allocated storage 127 or generate a new class file using bytecode modification 230. The bytecode replacer 256 can then redirect references intended for existing bytecode to the copied bytecode modification 230 or to the new class file. The bytecode replacer 256 can also remove the old bytecode from the virtual machine 120 (e.g., using a garbage collector).

In the case of a Java virtual machine (JVM) 120 and an application 126 written in the Java programming language (e.g., a Java application), source files (e.g., .java files) are compiled into virtual machine readable bytecode (e.g., class files) which may have a .class extension. Class files referenced by application 126 can be retrieved from the bytecode library 122 (e.g., class library) or from an external source and can be loaded into allocated storage 127 (e.g., heap) by a class loader. Java class files may be grouped together in .jar files. When updating Java class files at runtime, the bytecode modifier 128 can receive a patch 130 that includes one or more updated class files. The JVM 120 can parse the patch 130 to identify which class files the patch 130 is intended to update. The JVM 120 can then use a heap inspector to identify all instances of the to-be-updated class files within the allocated storage 127. The class loader can replace all such instances with the updated class files at runtime. A garbage collector can clear any outdated class files from allocated storage 127 and from any cache that exists within the JVM 120.

In an example of the bytecode modifier 228 performing a bytecode modification in a Java environment, the bytecode modification receiver 250 can receive a bytecode modification 230 that includes a class file identified as "dog.classh." Using the "dog.classh" identification, the bytecode inspector 254 (e.g., a Java heap inspector) can inspect an allocated storage for corresponding bytecode in the virtual machine, such as a class file named "dog.class." After an instance of the "dog.class" class file is identified, the bytecode replacer 256 (e.g., a Java class loader) can load the "dog.classh" class file into the allocated storage and redirect references to the "dog.class" class file to the "dog.classh" class file.

When bytecode modification 230 includes modified bytecode that is intended to modify multiple portions of existing bytecode (e.g., multiple class files) on the virtual machine 120, bytecode modification 230 can be a container or archive file (e.g., a .jar file). In this implementation, bytecode modification 230 can be include two or more distinct portions of bytecode, each for modifying different portions of existing bytecode on the virtual machine 120.

In an example of modifying multiple portions of bytecode in a Java environment, bytecode modification 230 is a .jar file that includes two class files, each intended to modify different Java class files loaded in the allocated storage 127 of the virtual machine 120. In this example, bytecode modification 230 can contain the modifications ProxyFactory.classh and Settings.classh for modifying ProxyFactory.class and Settings.class. The bytecode modifier 228 can modify the ProxyFactory.class and Settings.class files using the ProxyFactory.classh and Settings.classh using techniques described herein.

In a further implementation, the virtual machine 120 can remove bytecode by exploiting bytecode usage knowledge. The virtual machine 120 can detect a portion of bytecode that is called by a limited number of applications. Since the limited number of applications that can call the bytecode are known, then introducing a modification to bytecode of all of these applications is not likely to cause a major disruption.

Figure 3:
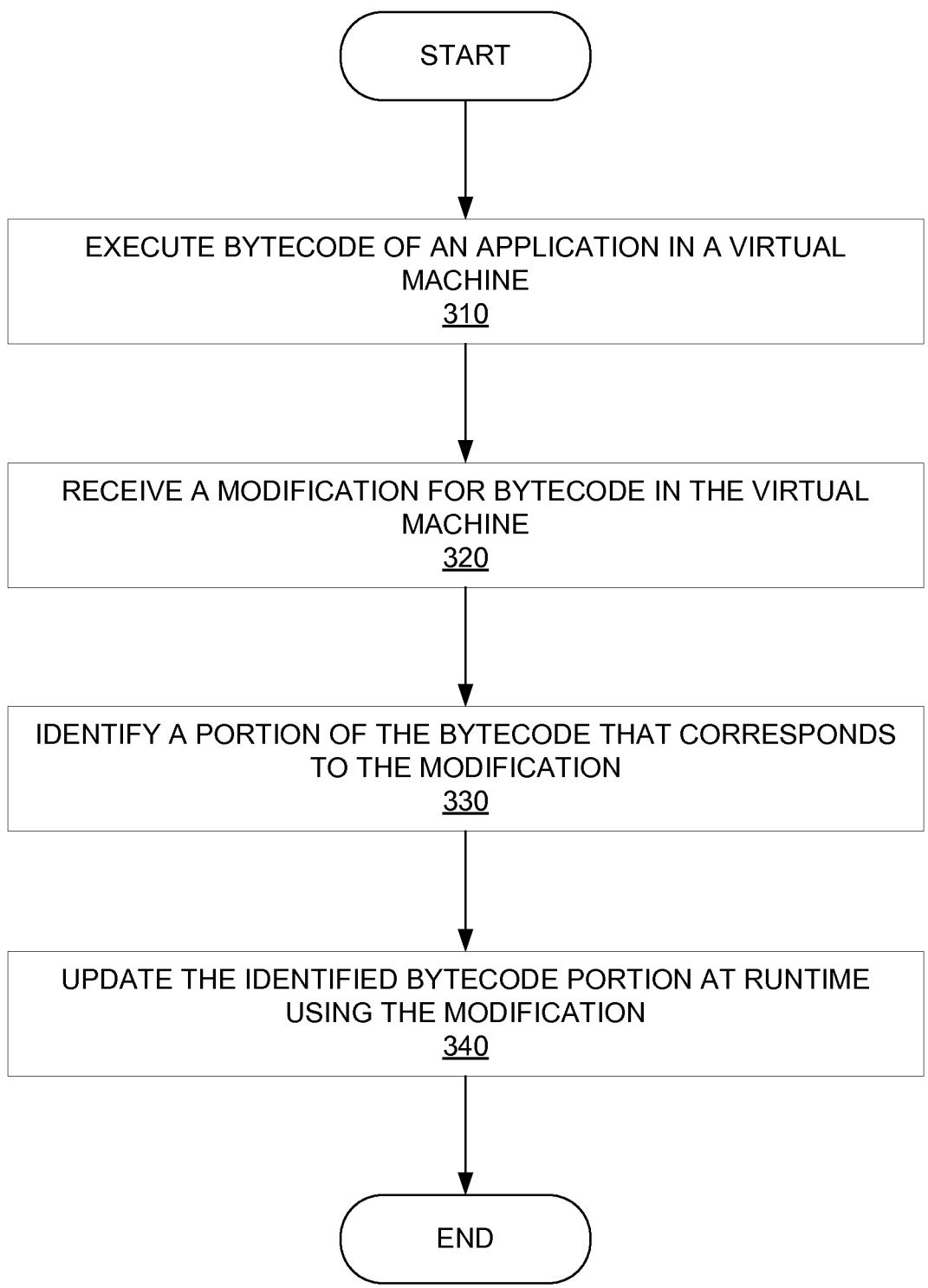
FIG. 3 is a flow diagram illustrating an embodiment of a method for modifying bytecode at runtime.

FIG. 3 is a flow diagram illustrating of one embodiment of a method 300 for modifying bytecode in a virtual machine. Method 300 can be performed by processing logic (e.g., in computing system 500 of FIG. 5) that may comprise hardware (e.g., circuitry, dedicated logic, programmable logic, microcode, etc.), software (such as instructions run on a processing device), firmware, or a combination thereof. In one embodiment, method 300 is performed primarily by bytecode modifier 228 of FIG. 2.

At block 310 of method 300, processing logic executes bytecode (e.g., class files) of an application in a virtual machine. At block 320, processing logic receives a modification for bytecode in the virtual machine. Processing logic can receive the modification for the bytecode of the application from any source, such as from a patch server, from a storage medium, from a system administrator that uploads the modification to the virtual machine, etc. The application can also include a thread that continually monitors a directory or a patch server for modifications to bytecode of the application.

At block 330, processing logic identifies a portion of the application's bytecode that corresponds to the modification. To accomplish this, processing logic can parse the modification and existing bytecode. Then processing logic can determine which bytecode the modification is to update. In one implementation, processing logic can identify a plurality of Java class types to be updated by the modification at runtime by parsing the names of class files in the modification. Then, processing logic can identify all instances of the bytecode to update within allocated storage of the virtual machine (e.g., a heap) by inspecting the allocated storage of the virtual machine, as described herein.

At block 340, processing logic updates the identified portions of bytecode using the modification. In one implementation, updating the identified portions of bytecode using the modification includes replacing existing instances of identified bytecode with new instances of replacement bytecode from the modification. In another implementation, updating the identified bytecode portion at runtime includes clearing existing bytecode from an allocated storage and storing modified bytecode in the allocated storage. In a further implementation, updating the identified bytecode includes transferring the modified bytecode to the virtual machine and redirecting calls to the existing bytecode to the modified bytecode.

Figure 4:
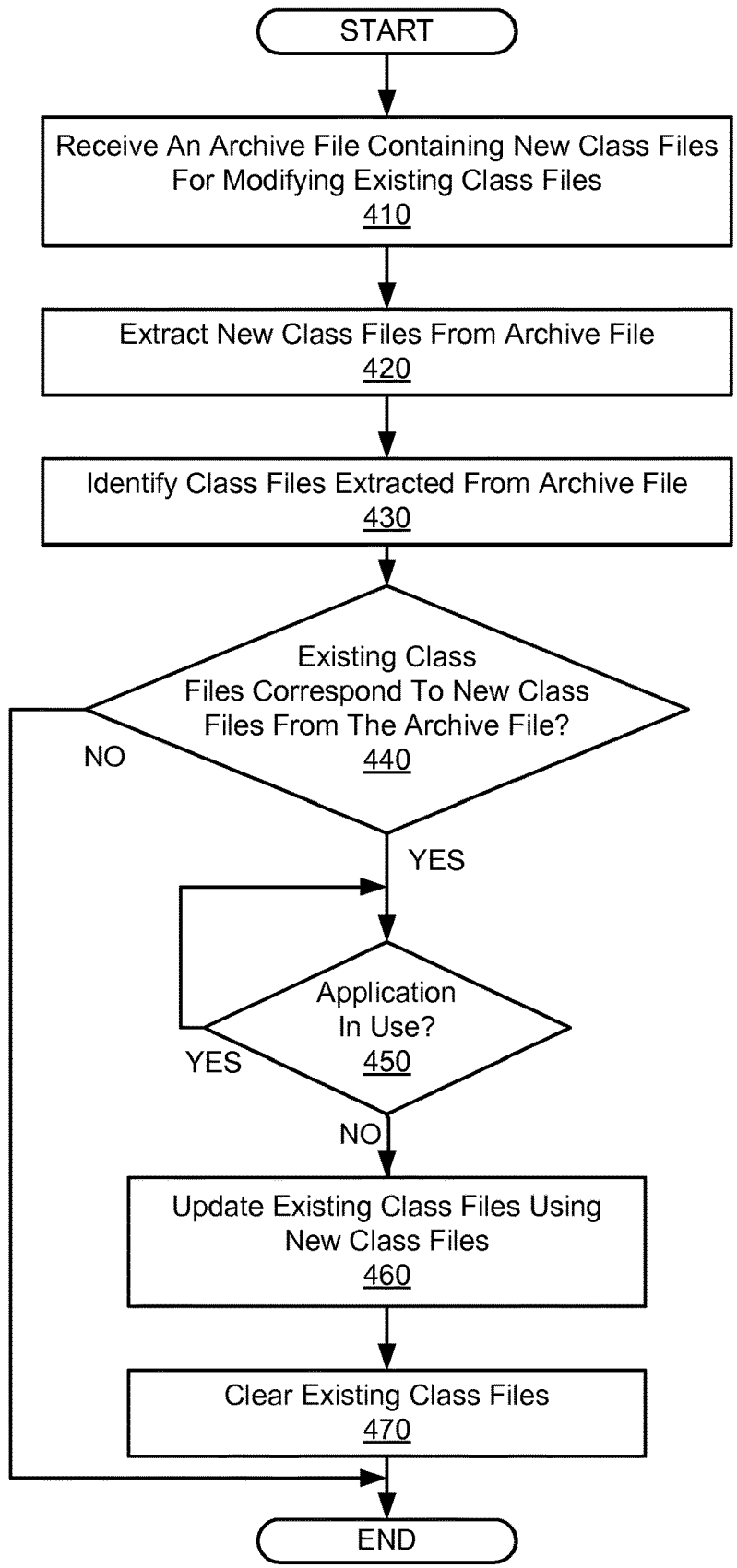
FIG. 4 is a flow diagram illustrating another embodiment of a method for modifying bytecode at runtime.

FIG. 4 is a flow diagram illustrating another embodiment of a method 400 for modifying bytecode at runtime of a virtual machine. Method 400 can be performed by processing logic (e.g., in computing system 500 of FIG. 5) that may comprise hardware (e.g., circuitry, dedicated logic, programmable logic, microcode, etc.), software (such as instructions run on a processing device), firmware, or a combination thereof. In one embodiment, method 400 is performed primarily by bytecode modifier 228 of FIG. 2.

At block 410 of method 400, processing logic receives an archive file containing class files for modifying an application. Processing logic can receive the archive file from any source including from a computer, server, portable storage media, etc. The archive file can be a Java archive file that contains Java class files. For the purpose of distinguishing different class files in this example, class files in the archive file are referred to as "new class files" while class files that exist in the virtual machine are referred to as "preexisting class files." At block 420, processing logic extracts the archive file to a storage or to memory allocated to a virtual machine (e.g., a heap). At block 430, processing logic identifies the new class files extracted from the archive file. Using the new class files, processing logic determines if the application includes preexisting class files that correspond to the new class files at block 440. If the application does not include any corresponding class files, method 400 ends.

If at block 440, processing logic identifies preexisting class files that correspond to the new class files of the archive, then at block 450 processing logic determines if the application is in use (e.g., when the virtual machine is executing the application). In one implementation, processing logic continues to check if the application is in use. In this implementation, when the application is not in use, processing logic updates the preexisting class files using the new class files at block 470 and clears the preexisting class files from an allocated storage (e.g., allocated memory, a cache) at block 480. In another implementation, processing logic omits performing block 450 and does not determine if the application is in use. When omitting block 450, processing logic proceeds from block 440 to updating the preexisting class files using the new class files at block 460 and then clearing the preexisting class files from an allocated storage and from any existing caches at block 470.

In one implementation, updating the preexisting class files using the new class files includes redirecting references intended for the preexisting class files to the new class files. For example, the new class files can be registered as the main sources for calls to the preexisting class files such that future application calls use the new class files instead of the preexisting class files. In yet another implementation, updating an old class file using a new class file includes merging an old and a new class file. For example, the new class file can contain portions of the preexisting class file that contain modifications. The new class file can be copied to the preexisting class file such that it replaces portions of the preexisting class file with modified portions while leaving the rest of the preexisting class file unmodified.

In one embodiment, to replace a preexisting class file processing logic can move or copy the preexisting class file to a temporary storage location. Processing logic can delete the preexisting class file from the virtual machine such that the only instances of the preexisting class file in the virtual machine are in the temporary storage. Processing logic can initialize a class file instance using the new class file. Then, processing logic can copy at least a portion of the preexisting class file from the temporary storage into the newly formed instance to fill in any gaps in the class file and to complete the modification routine. In this implementation, the new class file can include only the new portions of the class file and can use the preexisting class file for the portions that remain unmodified.

In another example, processing logic can initialize a class file instance using the old class file (e.g., by copying the old class file). Then, processing logic can replace at least a portion of the old class file with the new class file. The class file can be copied into the newly formed instance to overwrite portions of the class file to complete the modification routine.

In an example in a Java environment, a JVM receives an update patch that includes new class files ProxyFactory.classh and Settings.classh for modifying to two preexisting class files ProxyFactory.class and Settings.class. A heap inspector within the JVM identifies three instances of classes that correspond to the patch: proxyFact, which is an instance of ProxyFactory.class, and s1 and s2, which are instances of Settings.class. To update these two classes, a class loader within the JVM can redirect references intended for ProxyFactory and Settings class types to the new ProxyFactory.classh and Settings.classh class files. For example, the class loader can register ProxyFactory.classh and Settings.classh as main sources for ProxyFactory and Settings types. Whenever application 126 asks for one of those classes it will receive the modified bytecode that was in the patch. The class loader or garbage collector can also clear any ProxyFactory and Settings types from an allocated storage and any existing caches. An example algorithm can be:

For each classh type H, do:

```
clear H.class type from class loader cache
cache H.classh as a new H type for this class loader
```

For each type in the modification and for all their instances X on the Heap the HeapInspector, do:

```
create new instance Y of type X.getType( )
copy all data from X to Y
delete X
```

The virtual machine can perform the above example algorithm for each new class file. The new class file can be identified by the ".classh" file extension and can be a specific type (e.g., H, Settings, ProxyFactory, etc.). For each new class file, the virtual machine can clear or remove corresponding existing class files of the same type from a class loader cache. The class loader cache is a location of allocated memory that the class loader can use to store class files for fast access or to stage class files before loading them into storage allocated to the virtual machine. After clearing or removing the existing class files from the class loader cache, the virtual machine can store the new class files (e.g., files with a .classh extension) as a new class type in the class loader cache. In this manner, the new class files are ready to load into the virtual machine to update existing class files. Next, for each class type in the modification the heap inspector can create a new instance of a class type using the new class file. Then, data from the existing class file can be copied to the new instance after which the existing class file is deleted from the allocated storage of the virtual machine. The above routine can be repeated for each instance of each class file type in the allocate storage of the virtual machine until all instances are modified.

Figure 5:
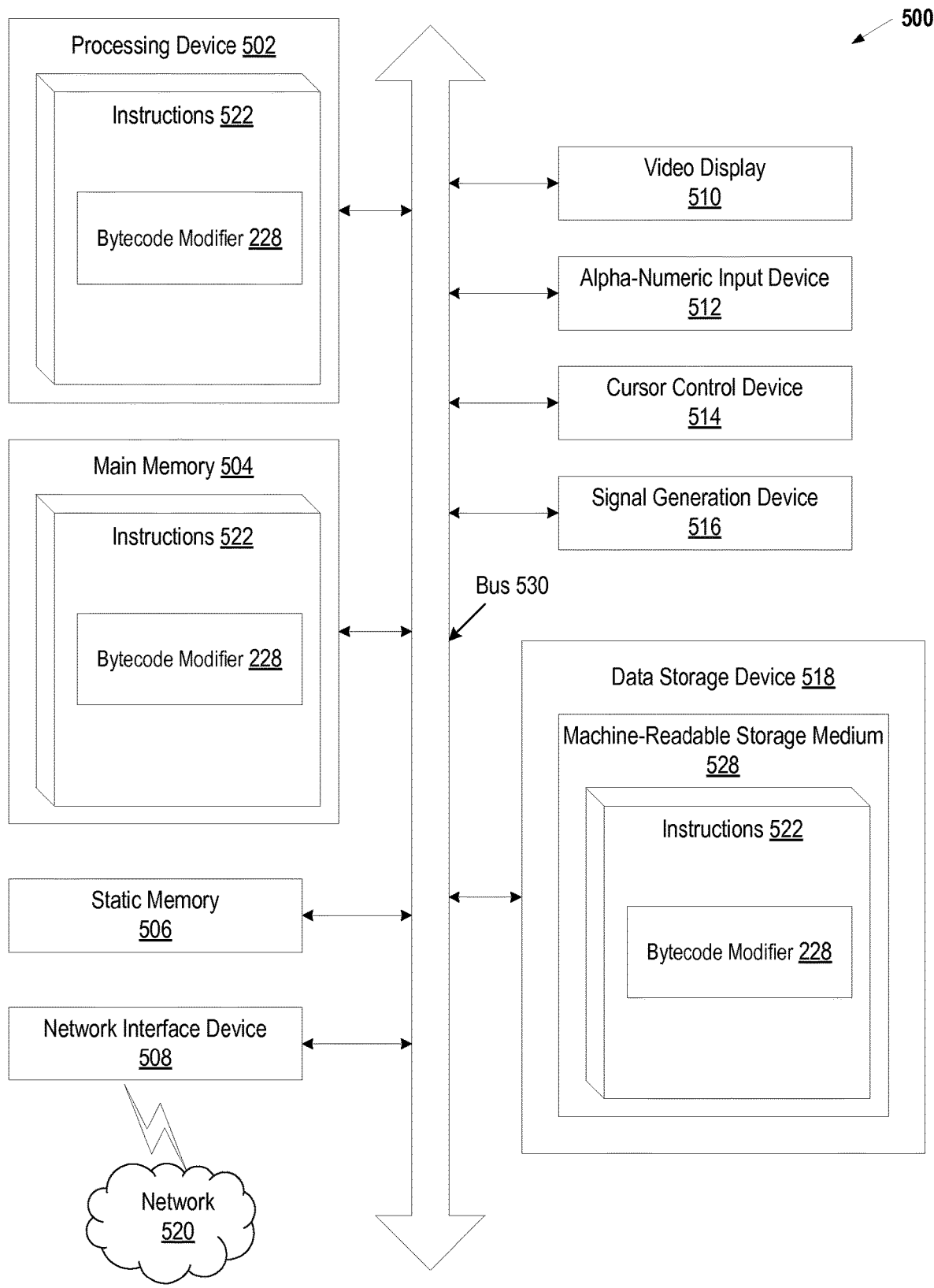
FIG. 5 illustrates a diagrammatic representation of a machine in an example form of a computing system.

FIG. 5 illustrates a diagrammatic representation of a machine in the exemplary form of a computing system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing system 500 includes a processing device 502, a main memory 504 (e.g., read-only memory (ROM), flash memory, dynamic random access memory (DRAM) (such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 can be configured to execute the bytecode modifier 128 for performing the operations and steps discussed herein.

Computing system 500 may further include a network interface device 508. Computing system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

Data storage device 518 may include a machine-readable storage medium (or more specifically a computer-readable storage medium) 520 having one or more sets of instructions (e.g., bytecode modifier 128) embodying any one or more of the methodologies of functions described herein. The bytecode modifier 128 may also reside, completely or at least partially, within main memory 504 and/or within processing device 502 during execution thereof by computing system 500; main memory 504 and processing device 502 also constituting machine-readable storage media.

Machine-readable storage medium 520 may also be used to store the device queue manager logic persistently. While machine-readable storage medium 520 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present disclosure. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "storing", "transmitting", "requesting", "identifying", "replacing", "receiving", "forwarding", "determining", "removing", "processing", "causing", "instructing", "disabling", or the like, refer to the action and processes of a computing system, or similar electronic computing device, that manipulates and transforms data represented as physical (electronic) quantities within the computing system's registers and memories into other data similarly represented as physical quantities within the computing system memories or registers or other such information storage, transmission or display devices.

Embodiments also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computing system bus.

The algorithms and displays presented herein are not inherently related to any particular computing system or other apparatus. Various general purpose systems may be used with programs in accordance with the teachings herein or it may prove convenient to construct more specialized apparatus to perform the required method steps. The required structure for a variety of these systems will be apparent from the description above. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
   determining, by a processing device, that a modification for bytecode of a virtual machine has been received in a storage location that is monitored by the virtual machine for modifications, wherein the modification is received while an application of the virtual machine that comprises a call to the bytecode is executing;
   parsing the modification to determine a class file corresponding to the bytecode being modified;
   determining usage of the class file that is being modified is limited by detecting a number of applications of the virtual machine that comprise calls to the class file does not exceed a predetermined limit;
   transferring the class file of the virtual machine to a temporary storage location;
   inspecting a heap of the virtual machine to identify multiple instances of the class file in memory allocated to the virtual machine;
   generating a new class file of the virtual machine, wherein the new class file comprises the modification to the bytecode;
   merging the class file in the temporary storage location into the new class file of the virtual machine;
   initializing a plurality of class file instances in the memory of the virtual machine using the new class file;
   redirecting references for each of the identified multiple instances to a respective class file instance of the plurality of class file instances while the applications of the virtual machine are in use; and
   removing the class file at the temporary storage location during the redirecting of the references.

2. The method of claim 1, wherein the bytecode of the new class file comprises one or more functions of a java class file.

3. The method of claim 1, further comprising:
   receiving a plurality of modified class files in the modification; and
   identifying a plurality of class files of the virtual machine to be updated by the modification at runtime in view of the received plurality of modified class files.

4. The method of claim 1, wherein generating the new class file occurs while the virtual machine is executing bytecode of the class file.

5. The method of claim 4, further comprising: identifying the references for the identified class file.

6. The method of claim 1, wherein the storage location that is monitored is a directory within the virtual machine or accessible to the virtual machine.

7. A system comprising:
   a memory; and
   a processing device, operatively coupled with the memory, to:
     determine that a modification for bytecode of a virtual machine has been received in a storage location that is monitored by the virtual machine for modifications, wherein the modification is received while an application of the virtual machine that comprises a call to the bytecode is executing;
     parsing the modification to determine a class file corresponding to the bytecode being modified;
     determine usage of the class file that is being modified is limited by detecting a number of applications of the virtual machine that comprise calls to the class file does not exceed a predetermined limit;
     transfer the class file of the virtual machine to a temporary storage location;
     inspect a heap of the virtual machine to identify multiple instances of the class file in memory allocated to the virtual machine;
     generate a new class file of the virtual machine, wherein the new class file comprises the modification to the bytecode;
     merging the class file in the temporary storage location into the new class file of the virtual machine;
     initialize a plurality of class file instances in the memory of the virtual machine using the new class file;
     redirect references for each of the identified multiple instances to a respective class file instance of the plurality of class files instances while the applications of the virtual machine are in use; and
     remove the class file at the temporary storage location during the redirecting of the references.

8. The system of claim 7, wherein the bytecode of the new class file comprises one or more functions of a java class file.

9. A non-transitory computer readable storage medium comprising instructions that, when executed by a processing device, cause the processing device to:
   determine that a modification for bytecode of a virtual machine has been received in a storage location that is monitored by the virtual machine for modifications, wherein the modification is received while an application of the virtual machine that comprises a call to the bytecode is executing;
   parsing the modification to determine a class file corresponding to the bytecode being modified;
   determine usage of the class file that is being modified is limited by detecting a number of applications of the virtual machine that comprise calls to the class file does not exceed a predetermined limit;
   transfer the class file of the virtual machine to a temporary storage location;
   inspect a heap of the virtual machine to identify multiple instances of the class file in memory allocated to the virtual machine;
   generate a new class file of the virtual machine, wherein the new class file comprises the modification to the bytecode;
   merging the class file in the temporary storage location into the new class file of the virtual machine;
   initialize a plurality of class file instances in the memory of the virtual machine using the new class file;

redirect references for each of the identified multiple instances to a respective class file instance of the plurality of class file instances while the applications of the virtual machine are in use; and remove the class file at the temporary storage location during the redirecting of the references.

10. The non-transitory computer readable storage medium of claim 9, wherein the bytecode of the new class file comprises one or more functions of a java class file.

11. The non-transitory computer readable storage medium of claim 9, wherein, the processing device is to:

receive a plurality of modified class files in the modification; and identify a plurality of class files of the virtual machine to be updated by the modification at runtime in view of the received plurality of modified class files.

12. The non-transitory computer readable storage medium of claim 9, wherein the new class file is generated while the virtual machine is executing the bytecode of the class file.

13. The non-transitory computer readable storage medium of claim 9, wherein the processing device is further to: identify the references for the identified class file.

\* \* \* \* \*